(12) United States Patent
Kahol et al.

(10) Patent No.: US 10,868,811 B2
(45) Date of Patent: *Dec. 15, 2020

(54) SECURE USER CREDENTIAL ACCESS SYSTEM

(71) Applicant: Bitglass, Inc., Campbell, CA (US)

(72) Inventors: Anurag Kahol, Los Gatos, CA (US); Anoop Kumar Bhattacharjya, Campbell, CA (US); Balas Natarajan Kausik, Los Gatos, CA (US)

(73) Assignee: Bitglass, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,146

(22) Filed: Nov. 5, 2018

(65) Prior Publication Data

US 2019/0075106 A1     Mar. 7, 2019

Related U.S. Application Data

(63) Continuation of application No. 15/098,312, filed on Apr. 13, 2016, now Pat. No. 10,122,714, which is a
(Continued)

(51) Int. Cl.
*H04L 29/06* (2006.01)
*G06F 16/958* (2019.01)
(Continued)

(52) U.S. Cl.
CPC ........ *H04L 63/0869* (2013.01); *G06F 16/958* (2019.01); *G06F 21/305* (2013.01); *G06F 21/602* (2013.01); *G06F 21/6227* (2013.01); *H04L 41/0893* (2013.01); *H04L 63/0428* (2013.01); *H04L 63/0471* (2013.01); *H04L 63/08* (2013.01); *H04L 63/0823* (2013.01);
(Continued)

(58) Field of Classification Search
None
See application file for complete search history.

(56) References Cited

U.S. PATENT DOCUMENTS 6,505,191 B1   1/2003   Baclawski
7,296,033 B1   11/2007  Lynch
(Continued)

FOREIGN PATENT DOCUMENTS

EP        2775420 A1    9/2014

OTHER PUBLICATIONS

Fahrnberger, "Computing On Encrypted Character Strings In Clouds", International Conference On Distributed Computing And Internet Technology, Springer Berlin Heidelberg pp. 244-254.
(Continued)

*Primary Examiner* — Kaveh Abrishamkar
(74) *Attorney, Agent, or Firm* — Wong & Rees LLP; Kirk D. Wong

(57) ABSTRACT

A proxy server mitigates security risks of user credentials sent across a network in clear text. The proxy server encrypts user credentials within a client application request destined for an application server. The proxy server forwards the client application request to the application server. The application server sends the encrypted user credentials to the proxy server where the proxy server decrypts the user credentials and authenticates the user credentials with an authentication server.

18 Claims, 15 Drawing Sheets

Related U.S. Application Data continuation-in-part of application No. 14/101,329, filed on Dec. 9, 2013, now Pat. No. 9,552,492, which is a continuation-in-part of application No. 13/957,274, filed on Aug. 1, 2013, now Pat. No. 9,553,867.

(51) Int. Cl.
| | | |
|---|---|---|
| *G06F 21/62* | (2013.01) | |
| *H04L 12/24* | (2006.01) | |
| *G06F 21/30* | (2013.01) | |
| *G06F 21/60* | (2013.01) | |
| *H04L 29/08* | (2006.01) | |

(52) U.S. Cl.
CPC .. *H04L 63/0884* (2013.01); *G06F 2221/2107* (2013.01); *G06F 2221/2115* (2013.01); *H04L 63/0272* (2013.01); *H04L 63/0281* (2013.01); *H04L 63/105* (2013.01); *H04L 67/28* (2013.01)

(56) References Cited

U.S. PATENT DOCUMENTS

| | | |
|---|---|---|
| 7,769,877 B2 | 8/2010 | McBride et al. |
| 8,259,568 B2 | 9/2012 | Laudermilch et al. |
| 8,281,125 B1 | 10/2012 | Briceno et al. |
| 8,417,642 B2 | 4/2013 | Oren |
| 8,719,898 B1 | 5/2014 | Barton et al. |
| 8,804,695 B2 | 8/2014 | Branam |
| 8,996,857 B1* | 3/2015 | Akella ............... H04L 63/0815 713/153 |
| 9,047,480 B2 | 6/2015 | Kahol et al. |
| 9,282,098 B1 | 3/2016 | Hitchcock et al. |
| 9,367,822 B2 | 6/2016 | Shipon |
| 9,552,492 B2 | 1/2017 | Kahol et al. |
| 9,553,867 B2 | 1/2017 | Kahol et al. |
| 9,769,148 B2 | 9/2017 | Kahol et al. |
| 2001/0033294 A1 | 10/2001 | Asch et al. |
| 2002/0038421 A1 | 3/2002 | Hamada |
| 2003/0065919 A1 | 4/2003 | Albert et al. |
| 2003/0177390 A1 | 9/2003 | Radhakrishnan |
| 2004/0158527 A1 | 8/2004 | Lambert |
| 2004/0243816 A1 | 12/2004 | Hacigumus et al. |
| 2004/0260680 A1 | 12/2004 | Best et al. |
| 2005/0108435 A1 | 5/2005 | Nowacki et al. |
| 2005/0165613 A1 | 7/2005 | Kim |
| 2005/0223224 A1 | 10/2005 | Carpentier et al. |
| 2006/0005237 A1 | 1/2006 | Kobata et al. |
| 2006/0005247 A1 | 1/2006 | Zhang et al. |
| 2006/0095958 A1 | 5/2006 | Lehinger et al. |
| 2006/0101510 A1 | 5/2006 | Kadyk et al. |
| 2006/0136990 A1 | 6/2006 | Hinton et al. |
| 2007/0101440 A1 | 5/2007 | Bhatia et al. |
| 2007/0127495 A1 | 6/2007 | Gregorio et al. |
| 2007/0150610 A1* | 6/2007 | Vassilev ............... H04L 63/08 709/230 |
| 2007/0245411 A1 | 10/2007 | Newton |
| 2007/0294235 A1 | 12/2007 | Millett |
| 2008/0059414 A1 | 3/2008 | Cristofor et al. |
| 2008/0077809 A1 | 3/2008 | Hayler et al. |
| 2008/0125123 A1 | 5/2008 | Dorenbosch et al. |
| 2008/0133460 A1 | 6/2008 | Clark et al. |
| 2008/0133935 A1 | 6/2008 | Elovici et al. |
| 2008/0288648 A1* | 11/2008 | Schneider ............. H04L 63/083 709/229 |
| 2008/0294909 A1 | 11/2008 | Ostrovsky et al. |
| 2009/0055642 A1 | 2/2009 | Myers et al. |
| 2009/0077378 A1 | 3/2009 | Hacigumus et al. |
| 2009/0100033 A1 | 4/2009 | Kim et al. |
| 2009/0282239 A1* | 11/2009 | Doleh ............... G06F 21/335 713/155 |
| 2009/0300351 A1 | 12/2009 | Lei et al. |
| 2010/0031317 A1* | 2/2010 | Mason ............... H04L 63/0281 726/3 |
| 2010/0049790 A1 | 2/2010 | Schreiber |
| 2010/0121856 A1 | 5/2010 | Lei et al. |
| 2010/0153403 A1 | 6/2010 | Chang et al. |
| 2010/0246827 A1 | 9/2010 | Lauter et al. |
| 2010/0274986 A1 | 10/2010 | Matsumoto |
| 2010/0306221 A1 | 12/2010 | Lokam et al. |
| 2010/0306547 A1 | 12/2010 | Fallows et al. |
| 2011/0004607 A1 | 1/2011 | Lokam et al. |
| 2011/0119481 A1 | 5/2011 | Auradkar et al. |
| 2011/0131408 A1 | 6/2011 | Cook et al. |
| 2011/0153448 A1* | 6/2011 | Thomas ............... G06Q 10/06 705/26.3 |
| 2011/0202988 A1* | 8/2011 | Otranen ............... H04L 9/3213 726/8 |
| 2011/0276683 A1 | 11/2011 | Goldschlag et al. |
| 2012/0078914 A1 | 3/2012 | Roeder et al. |
| 2012/0117080 A1 | 5/2012 | Lamanna et al. |
| 2012/0159180 A1 | 6/2012 | Chase et al. |
| 2012/0293597 A1 | 11/2012 | Shipon |
| 2012/0297201 A1 | 11/2012 | Matsuda et al. |
| 2012/0311420 A1 | 12/2012 | Penberthy et al. |
| 2013/0046974 A1 | 2/2013 | Kamara et al. |
| 2013/0064092 A1 | 3/2013 | Xi et al. |
| 2013/0066832 A1 | 3/2013 | Sheehan et al. |
| 2013/0067225 A1 | 3/2013 | Shochet et al. |
| 2013/0074148 A1 | 3/2013 | Megchelen |
| 2013/0097284 A1 | 4/2013 | Bai et al. |
| 2013/0151844 A1 | 6/2013 | Messerschmidt |
| 2013/0159695 A1 | 6/2013 | Chiueh et al. |
| 2013/0179985 A1* | 7/2013 | Strassmann ............. G06F 21/60 726/26 |
| 2013/0191650 A1 | 7/2013 | Balakrishnan et al. |
| 2013/0219479 A1 | 8/2013 | DeSoto et al. |
| 2013/0219511 A1 | 8/2013 | Fielding et al. |
| 2013/0262863 A1 | 10/2013 | Yoshino et al. |
| 2013/0287210 A1 | 10/2013 | Matsuda et al. |
| 2014/0006377 A1 | 1/2014 | Astore |
| 2014/0052999 A1 | 2/2014 | Aissi et al. |
| 2014/0053227 A1 | 2/2014 | Ruppin et al. |
| 2014/0082091 A1 | 3/2014 | Rexer |
| 2014/0096162 A1 | 4/2014 | Casey et al. |
| 2014/0122866 A1 | 5/2014 | Haeger et al. |
| 2014/0149794 A1 | 5/2014 | Shetty et al. |
| 2014/0189685 A1 | 7/2014 | Kripalani |
| 2014/0331297 A1 | 11/2014 | Innes et al. |
| 2014/0351915 A1 | 11/2014 | Otranen et al. |
| 2015/0039677 A1 | 2/2015 | Kahol et al. |
| 2015/0039886 A1 | 2/2015 | Kahol et al. |
| 2015/0039887 A1 | 2/2015 | Kahol et al. |
| 2016/0087970 A1 | 3/2016 | Kahol et al. |
| 2016/0234209 A1 | 8/2016 | Kahol et al. |
| 2017/0019405 A1 | 1/2017 | Kahol et al. |

OTHER PUBLICATIONS

Jammalamadaka et al., "A Middleware Approach For Outsourcing Data Securely", Computers & Security 32 pp. 252-266.
U.S. Appl. No. 13/957,274, Final Office Action dated May 5, 2016.
U.S. Appl. No. 13/957,274, Non-Final Office Action dated Sep. 24, 2015.
U.S. Appl. No. 13/957,274, Notice of Allowance dated Sep. 12, 2016.
U.S. Appl. No. 14/095,163, Non-Final Office Action dated Oct. 19, 2018.
U.S. Appl. No. 14/101,326, Final Office Action dated Aug. 11, 2014.
U.S. Appl. No. 14/101,326, Non-Final Office Action dated Feb. 27, 2014.
U.S. Appl. No. 14/101,326, Notice of Allowance dated Jan. 21, 2015.
U.S. Appl. No. 14/101,329, Final Office Action dated Jun. 17, 2015.
U.S. Appl. No. 14/101,329, Non-Final Office Action dated Jan. 14, 2015.
U.S. Appl. No. 14/101,329, Non-Final Office Action dated Dec. 21, 2015.
U.S. Appl. No. 14/101,329, Notice of Allowance dated Oct. 7, 2016.
U.S. Appl. No. 14/954,989, Final Office Action dated Aug. 8, 2016.

(56) References Cited

OTHER PUBLICATIONS

U.S. Appl. No. 14/954,989, Final Office Action dated Aug. 11, 2017.
U.S. Appl. No. 14/954,989, Final Office Action dated Aug. 27, 2018.
U.S. Appl. No. 14/954,989, Non-Final Office Action dated Mar. 21, 2016.
U.S. Appl. No. 14/954,989, Non-Final Office Action dated Feb. 21, 2017.
U.S. Appl. No. 14/954,989, Advisory Action dated Dec. 15, 2017.
U.S. Appl. No. 14/954,989, Non-Final Office Action dated Feb. 8, 2018.
U.S. Appl. No. 15/098,312, Final Office Action dated May 8, 2017.
U.S. Appl. No. 15/098,312, Non-Final Office Action dated Aug. 12, 2016.
U.S. Appl. No. 15/098,312, Non-Final Office Action dated Nov. 2, 2017.
U.S. Appl. No. 15/283,216, Non-Final Office Action dated Mar. 7, 2017.
U.S. Appl. No. 15/283,216, Notice of Allowance dated Jun. 29, 2017.
U.S. Appl. No. 14/954,989, Non-Final Office Action dated Jan. 25, 2019.
United States Patent and Trademark Office, U.S. Appl. No. 14/954,989, Notice of Allowance dated Apr. 23, 2020.
United States Patent and Trademark Office, U.S. Appl. No. 16/876,163, Non-Final Office Action dated Jul. 10, 2020.

* cited by examiner

SECURE USER CREDENTIAL ACCESS SYSTEM

CROSS-REFERENCE TO RELATED APPLICATIONS; PRIORITY CLAIM

This application claims benefit as a Continuation of U.S. application Ser. No. 15/098,312, filed Apr. 13, 2016, which is a continuation-in-part of U.S. application Ser. No. 14/101,320, filed Dec. 9, 2013, now U.S. Pat. No. 9,552,492, issued Jan. 24, 2017, which is a continuation-in-part of U.S. patent application Ser. No. 13/957,274, filed Aug. 1, 2013, now U.S. Pat. No. 9,553,867, issued Jan. 24, 2017, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to data security, and in particular, to securing data on servers and client devices external to corporate infrastructures.

BACKGROUND

The proliferation of sensitive corporate data outside of corporate-controlled infrastructures is becoming more widespread as IT departments allow employees to use personal computing devices, such as mobile phones, tablets, etc., to access the corporate-controlled infrastructures. IT departments have little control over employee-owned devices. Data loss can occur when an employee or former employee distributes or misplaces corporate data to third parties. Of the two sources, the loss of data in devices that are owned by former employees is more of a concern.

Current solutions for providing such security are broadly called "Mobile Device Management" solutions. Such solutions require the corporation to install a software agent on each personal computing device. In the event the device is lost or the employee leaves the corporation, the software agent can be remotely activated to delete all data owned by the corporation on the device. At the same time, the agent does not delete personal data such as photos, etc., that belong to the user rather than the corporation. The installation and management of software agents on each computing device, whether privately owned by the employee or owned by the corporation, is a difficult and expensive process as there are a large number of different devices running different software systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
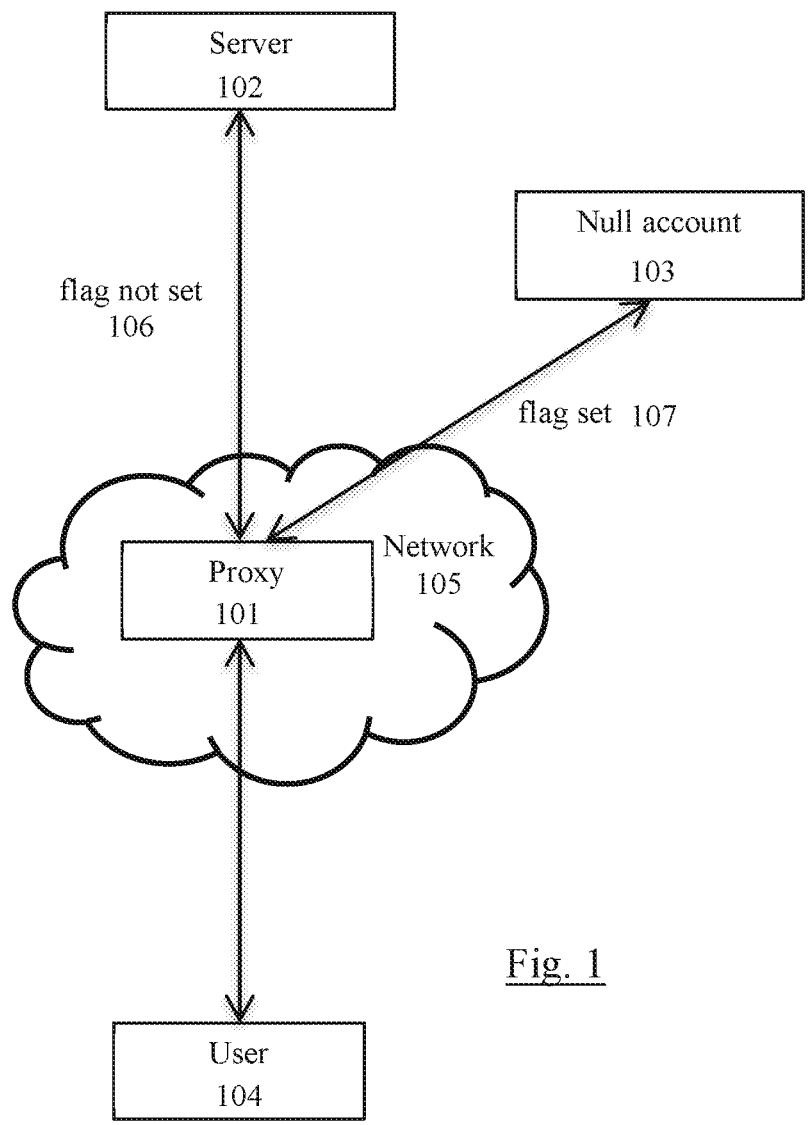
FIG. 1 illustrates a topology of a proxy system, according to an embodiment of the invention.

Example embodiments, which relate to secure applications access and data security, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. REMOTE WIPING OF APPLICATIONS ON MOBILE DEVICES
3. PROXY ROUTING
4. ANALYTICS AND REPORTING
5. DATA TRACKING AND WATERMARKING
6. BROWSER CACHE MANAGEMENT
7. MANAGEMENT CONSOLE AND ACCOUNTING
8. DATA ENCRYPTION
9. ENHANCED APPLICATION PERFORMANCE
10. IMPLEMENTATION MECHANISMS—HARDWARE OVERVIEW

11. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

In some embodiments, information security risks caused by two trends in computing technology are addressed that include, but are not limited to: (a) the growing prevalence of user/employee-owned personal mobile computing devices, e.g., smartphones, tablets, etc., and (b) the shift in business computing applications being hosted on servers, as captive deployments, within a corporation to "cloud applications" being hosted by third party vendors on shared servers for multiple customers. As a result, sensitive business data resides on servers not owned by the business and is transmitted by networks not owned by the business to client devices owned by the user/employee rather than the business. In such a situation, conventional techniques that secure the data by securing the infrastructure are no longer practicable.

In an embodiment, a system resides in the network path of corporate data. The system regulates user access to the data, as well as manipulates the data in such a fashion so as to secure it on infrastructure not owned by the corporation, e.g., client devices, shared servers, shared storage, shared networks, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. REMOTE WIPING OF APPLICATIONS ON MOBILE DEVICES

In an embodiment, the security of corporate data on mobile devices is addressed. As mobile personal computing devices such as smartphones and tablets proliferate, users want to access sensitive corporate data from anywhere on any device. Often, the device is privately owned by the user rather than the corporation. For example, a doctor might want to access her email at a hospital from home, using her personal computing tablet. In such cases, corporations need to secure the data on the computing device so that it does not fall into the wrong hands.

As mentioned above, the installation and management of software agents on each computing device, whether privately owned by the employee or owned by the corporation, is a difficult and expensive process as there are a large number of different devices running different software systems.

Referring to FIG. 1, a topology of a proxy system is shown. In an embodiment, a proxy 101 can remotely and selectively delete corporate data on mobile computing devices without the need for software agents to be installed on each mobile computing device. Proxy 101 may essentially be in the "cloud." Communication between proxy 101, server 102, and user device 104 may occur across network 105. Network 105 comprises, but is not limited to, any of: the Internet, intranet, local area networks (LANs), wide area networks (WANs), dedicated links, private computer networks, public computer networks, enterprise computer networks, etc. Mobile computing devices access any and all corporate applications through the network proxy 101. A mobile computing device as described herein can be, but is not limited to, any of: cellular phones, tablet computers, handheld devices, laptops, e-readers, personal computing devices, game devices, etc. Under normal conditions, the proxy 101 receives one or more network requests from one or more client application programs resident on the user's computing device 104 and then forwards the requests to the server 102. In turn, the proxy 101 receives the response from the server 102 and forwards it to the client software on the user's mobile device 104.

For each application program handled by the server 102, the proxy 101 maintains a null account 103 with no contents. For example, when an application is an email application, a null account would have no email messages contained in the account. In another example, when an application is a file storage application, a null account is an empty file folder with no contents. In yet another example, when an application is a calendar application, a null account is a calendar with no entries, appointments, etc. In yet another example, when an application is a list of contacts with phone numbers and addresses and so forth, a null account would be a list of contacts without entries. It is important to note that a null account is a valid account within the format appropriate to the application, but devoid of contents. Under an exception condition where the corporation wants to erase all application data for a particular application resident on the user's mobile device, the proxy 101 forwards the user request to the null account 103. The resulting "null" response in the appropriate format for the particular application is returned to the user's mobile device. The client software on the user's mobile device acts on the null response and synchronizes the client and the server, thereby deleting all the contents stored on the mobile device for the particular application. In an embodiment, synchronizing the mobile device with a null account as described above is useful when the user's application account is in a non-empty state, e.g., where normal synchronization of the mobile device with the server 102 would leave residual data on the mobile device. Synchronizing with a null-account wipes out the data that would otherwise be resident on the mobile device. In contrast, simply denying access to the application would leave data resident on the mobile device.

As an example, a user accesses his corporate email via an email client on a smartphone. The email client saves the user's email account information and password. Each time the email client is opened, it synchronizes its contents with the user's mailbox on the server 102 by pulling down new email, updating calendar & contacts, erasing deleted email, etc. When the user connects to the email server 102 via the proxy server 101, under normal conditions, the email client synchronizes with the user's email account on the server 102. In an exception condition, the proxy 101 synchronizes the user's email client with an empty mailbox 103 causing all contents on the client to be erased. The proxy 101 erases sensitive content on the user's mobile device, without requiring a specialized software agent on the device.

Although proxy server 101, server 102, and user mobile device 104 are shown in FIG. 1 as single entities, one or more of each element is possible in other embodiments.

Figure 2:
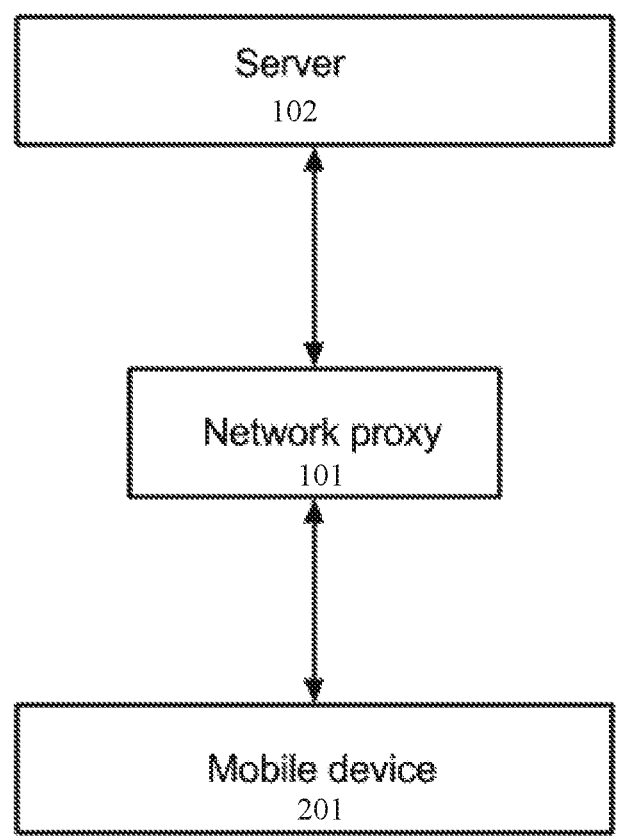
FIG. 2 illustrates a network proxy, according to an embodiment of the invention.

Referring to FIG. 2, a network proxy is shown. In an embodiment, the network proxy 101 supports various common application protocols such as email and http. In a typical deployment, traffic between the network proxy 101 and the mobile device 201 is encrypted via SSL Likewise, traffic between the network proxy 101 and the application servers 102 is also encrypted. Within the network proxy 101, traffic is clear text, allowing for inspection and analysis.

Figure 3A:
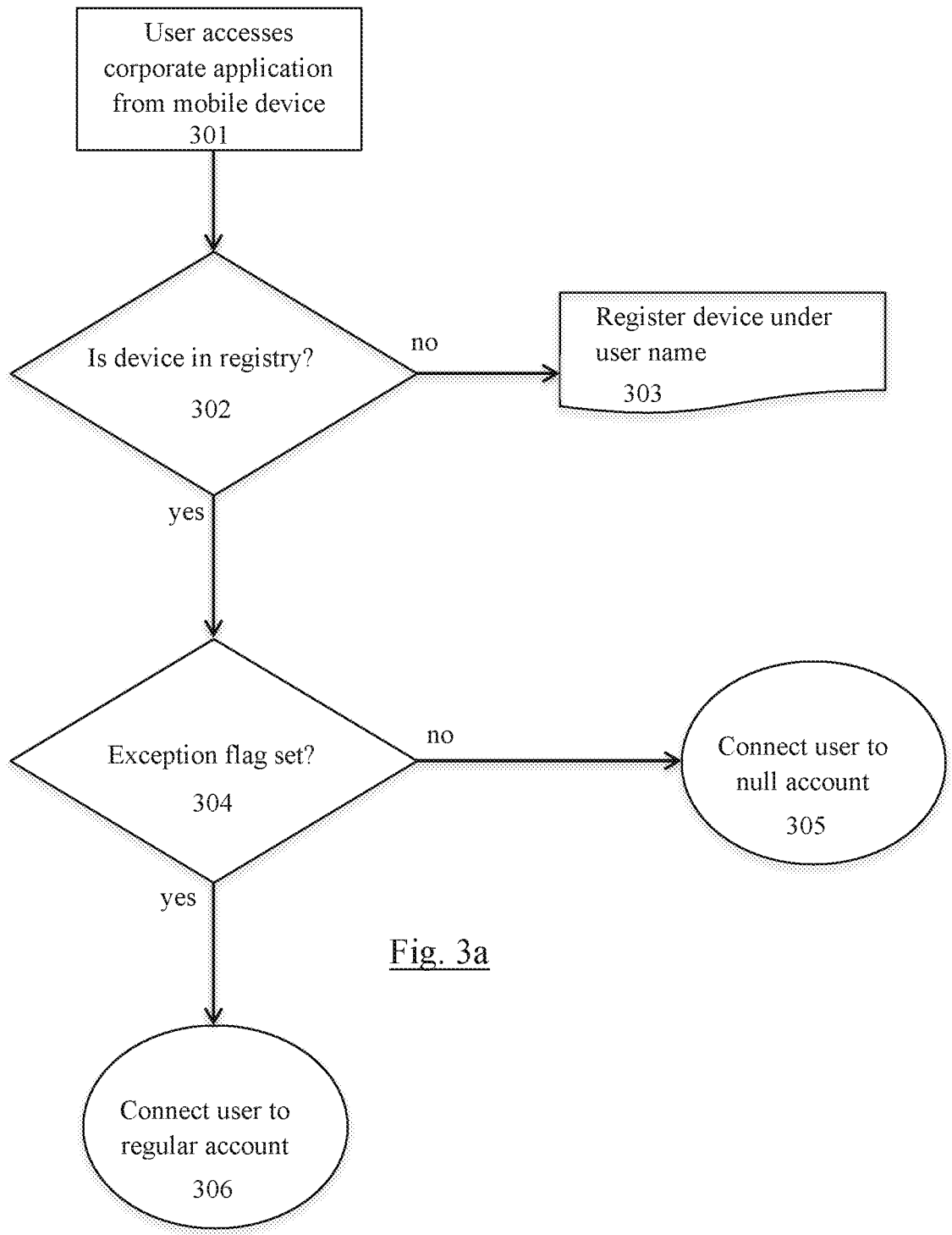
FIG. 3a shows a flow chart, according to an embodiment of the invention.

Referring to FIG. 3a, a flow chart is shown. When a user accesses a corporate application 301 from a mobile device 201, the network proxy 101 registers the mobile device 201 under the user's login name and stores the registration in a table 303, if such an entry does not already exist 302. If an entry already exists 302, the proxy 101 checks to see if the entry carries an exception flag 304. If the exception flag is not set 106, the proxy 101 forwards the user client request to the server and access proceeds normally 306. If the exception flag is set 107, the network proxy 101 forwards the user request 305 to a null account 103 for that application hosted on the network proxy 101. In the latter case, the client corporate application on the user's mobile device 201 synchronizes with null account 103, thereby wiping out the contents of the corporate application on the user's mobile device 201.

Null accounts 103 for each application may be hosted on the network proxy 101, or in the server 102 for the corporate application. The network proxy 101 also carries a management console wherein an administrator can search for users and set exception flags for each device employed by a user to access corporate applications.

In an alternate embodiment, exception flags can be set individually for each application, so that the administrator can select the set of applications whose data are to be deleted on the mobile device 201.

In yet another embodiment, the invention could be implemented directly on the server 102 rather than a network proxy 101, thereby enabling selective remote wiping of all data for application programs resident on the server 102.

Commercial email offerings such as Google mail and Microsoft Exchange support a protocol called ActiveSync for synchronizing the content on mobile client devices and the server. ActiveSync also supports a number of security features such as password management and remote data wipe. Specifically, the email server keeps track of the mobile devices that access each email account. When a mobile device is compromised, a flag can be set on the management console that triggers a command being sent to the device to remotely wipe all the data stored. However, the remote wipe is typically total, rather than selective, in that all content on the client device is erased restoring the device to factory default conditions. In the case where the mobile device is personally owned by an employee, the ActiveSync remote wipe feature could lead to a catastrophic data loss for the employee since the approach erases both corporate data and personal data on the employee's mobile device, e.g., all of the user's photos on the mobile device would be erased.

To overcome this limitation, Mobile Device Management solutions commercially available from companies such as Good Technology, MobileIron, etc., install a software agent on each mobile device that accesses corporate applications. The agent on the device flags each piece of data downloaded to the device as being "corporate" or "personal." When the device is compromised or lost, the remote wipe function can be used by the administrator to erase all corporate data from the device.

In an alternative embodiment of the invention, the proxy 101 may trap the ActiveSync remote wipe command between the server 102 and a compromised mobile device 201. Rather than forwarding the command to the mobile device 201, the proxy 101 may set the exception flag for the mobile device in its condition table. The management console on the email server 102 supporting the ActiveSync protocol may be used to trigger a remote wipe of a compromised mobile device, thereby preserving the operations of the present invention, where only data owned by the corporation is erased and personal data belonging to the user is untouched.

3. PROXY ROUTING

In an embodiment, an application resides at the URL www dot application dot com. The corporation creates an alternate URL for users to access, e.g., of the form www dot application dot proxy dot com and refers users to the alternate URL which points to the network proxy 101. The corporation can also restrict access to www dot application dot com to the proxy 101 so that users cannot directly access the application. Thus, such restriction is enforced by only permitting direct access to the application server 102 by the IP address at which the proxy 101 is located.

In an embodiment, direct access to the application may be restricted via a login process. Many applications allow the administrator to delegate login to a centralized directory in a company. Such delegation to a central directory is useful in a corporation where replicating the login information for every employee at each application is difficult to manage. The delegation may be implemented as a network call from the application server to the centralized directory, and may be specified as a URL or other means. In the case of delegated login, when a user attempts to login to an application from his content browser, the application redirects the user to the centralized directory. The user then presents his login credentials to the directory and, if successful, is redirected to the application. One aspect of an embodiment is a "man-in-the-middle" of the delegated authentication process that forces the final authenticated request to flow through the proxy regardless of whether the first request was made by the client directly to the application or through the proxy.

Figure 3B:
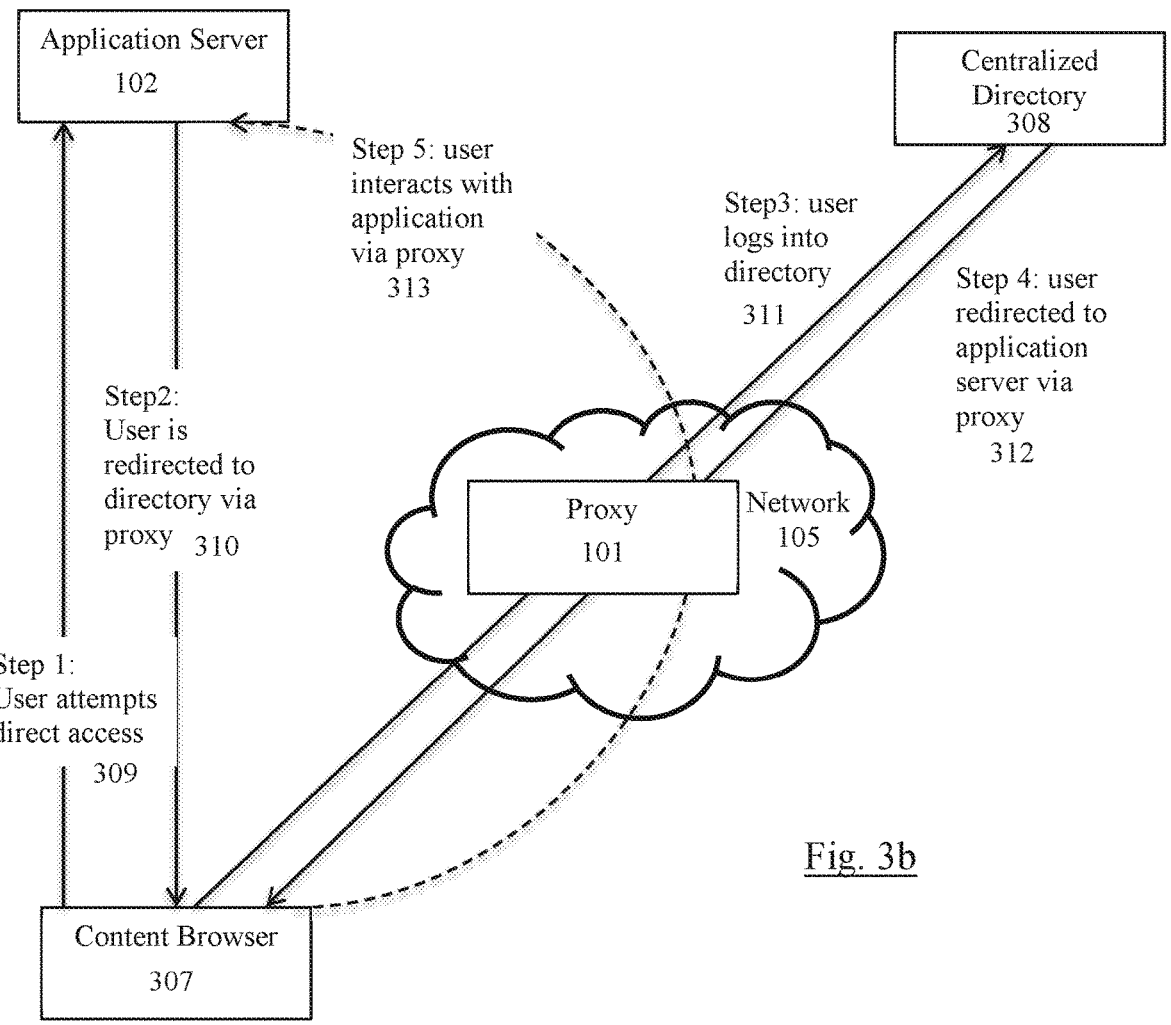
FIG. 3b illustrates a proxy in a network, according to an embodiment of the invention.

Referring to FIG. 3b, in an embodiment, a user attempts access 309 to the application 102 via a content browser 307. The application server 102 may redirect 310 the request to point to the centralized directory 308 via the proxy 101. The content browser 307 then visits the centralized directory 308 via the proxy 101 and, upon successful login 311, is redirected 312 via the proxy 101 back to the application 102. The user, via the content browser 307, then interacts 313 with the application 102 via the proxy 101. In an alternate embodiment, the first redirect 310 may be directed to the centralized directory 308 but, upon successful login to the centralized directory 308, the user is redirected to the application 102 via the proxy 101. In another embodiment, the proxy 101 can act as an authentication intermediary where it presents itself as the centralized directory to the application and as the application to the centralized directory. Hence, brokering all authentication requests and manipulating the requests and responses such that the final client request flows through the proxy. In the above cases, the user is forced to access the application via the proxy even though the user attempted to access the application directly.

An alternate embodiment of delegated login concerns client applications where the user enters and saves his or her username and password directly into the client application. In such cases, the client application transmits the user's credentials to the application server with each application access request to authenticate each request. The application access request may request access to an application hosted by an application server, request access to a resource managed by an application server, request application specific data, etc. For example, in some mobile email applications, the user enters his email address and password into the client application during setup. Thereafter, the client application stores the credentials and sends them to the application server with each request to receive or send emails. Upon receiving a request from the client application, the application server forwards the credentials to the centralized directory of the corporation for validation. The centralized directory responds on whether or not the credentials are valid. If the credentials are valid, the application server responds to the client application's request, else, the application server rejects the request.

When the application server is hosted by a third-party, the corporation suffers cyber risk in the transmission of user credentials from the client application to the application server because the user credentials are transmitted in clear text from the client application to the third-party application server. To mitigate this risk, in an embodiment the application server does not handle clear-text user credentials. The embodiments described herein improve the performance and security of information technology systems by mitigating security risks and preventing fraudulent accesses to secure resources.

Figure 3C:
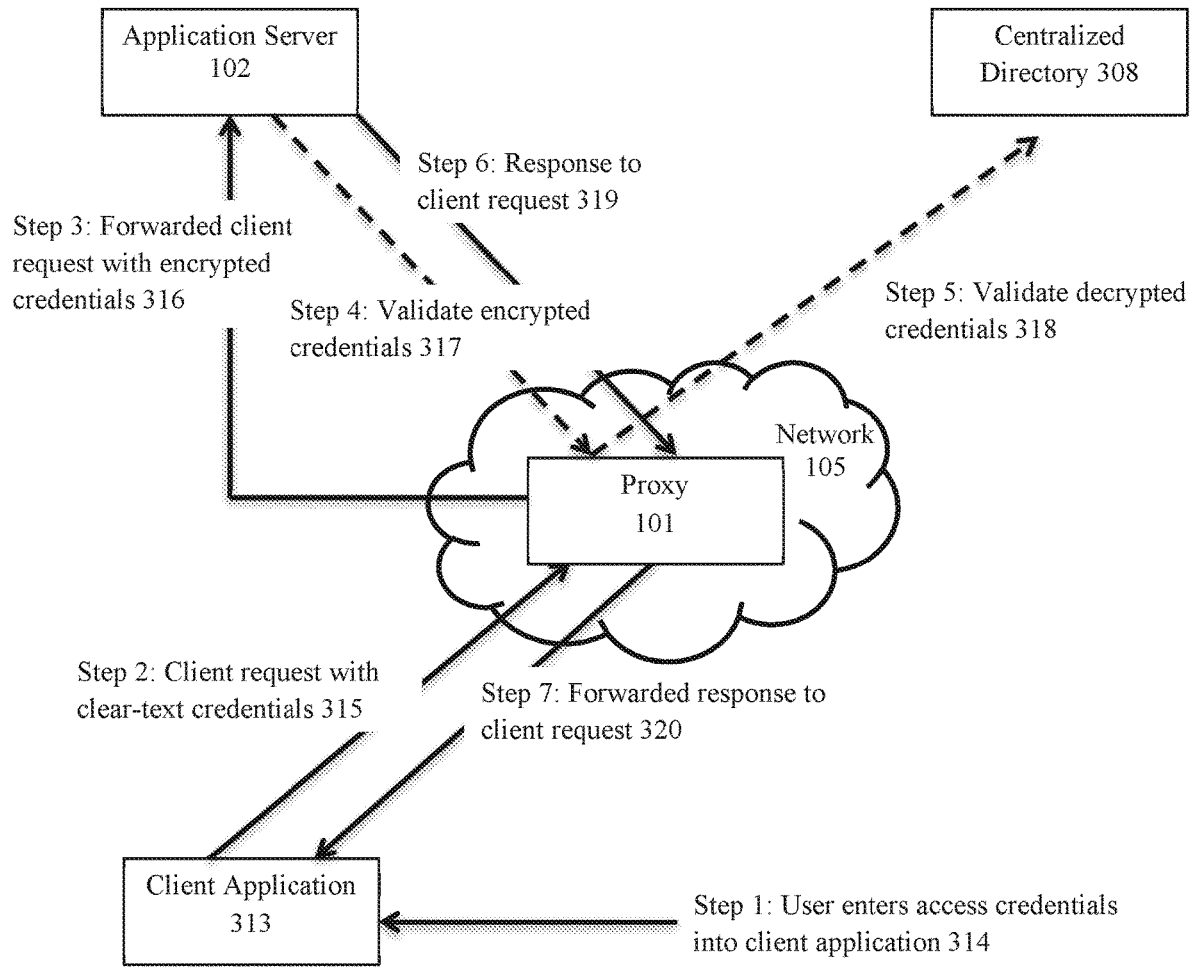
FIG. 3c illustrates a proxy in a network encrypting access credentials with a delegated login, according to an embodiment of the invention.

Referring to FIG. 3c, the client application 313 is configured during setup to communicate with a proxy server 101 rather than directly with the application server 102. The client application 313 transmits the user credentials in clear-text 315 to the proxy server 101 along with each client application access request sent over network 105. The proxy server 101 encrypts the user credentials and forwards the client application access request 316 to the application server 102. The application server 102 is configured to validate credentials at the proxy server 101 rather than directly at the corporate directory 308. With the user credentials encrypted by the proxy server 101, the application server 102 does not have access to the user credentials. Therefore, upon receiving the forwarded client application access request from the proxy server 101, the application server 102 authenticates the request by sending the encrypted user credentials 317 attached to the request back to the proxy server 101.

The proxy server 101 decrypts the encrypted user credentials and validates 318 them against the corporate centralized directory 308. This separates the original client application request from the user credentials, further improving security of the system by removing the pathway where the system can be spoofed by an intruder. The proxy server 101 responds to the application server 102 on whether or not the encrypted credentials are valid. If the validation response is affirmative, the application server 102 responds to the original forwarded client application access request from the user, else it rejects the request 319. The proxy server 101 forwards the response 320 received from the application server 102. The benefit of this approach are two-fold: (i) the application server does not handle user credentials in the clear, and (ii) the proxy server can be hosted at a trusted entity or within the corporation, thereby mitigating cyber risk.

Figure 3D:
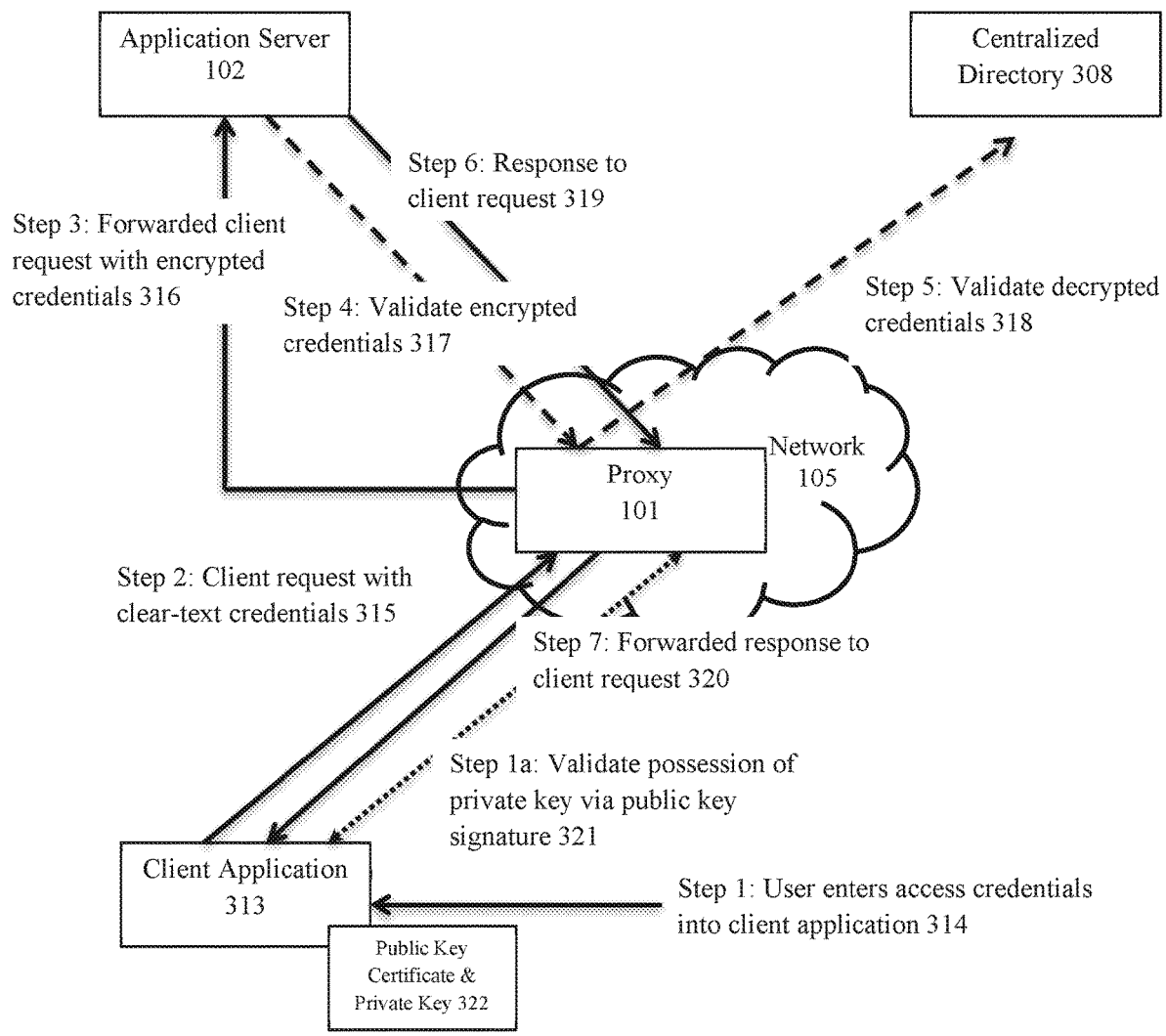
FIG. 3d illustrates a proxy in a network that authenticates via digital signatures and encrypted access credentials with a delegated login, according to an embodiment of the invention.

Referring to FIG. 3d, in another embodiment, the proxy server 101 may first validate a public-key signature prior to encrypting the user's credentials and forwarding it to the application server. In such an embodiment, the proxy server 101 requires the client to digitally sign a hash with the client's private key while setting up an encrypted communication tunnel. The client application 313 obtains the hash certificate that has been digitally signed using the client's private key 322. The client application 313 sends the digitally signed hash certificate 321 to the proxy server 101. The hash certificate may be sent with the client application access request 315 or separately. When sent separately, the order in which the hash certificate and the client application access request are sent by the client application to the proxy server may vary. The proxy server 101 then verifies the signature of the hash certificate with the client's public-key certificate before proceeding with the steps described above with respect to FIG. 3c. This additional step in this modified embodiment offers two-factor authentication—the client's private key and then the user credentials. Other embodiments or modifications may use different forms of client verification other than using public/private key verification.

In an embodiment, the proxy server 101 only validates the client's private key via a digital signature, and ignores any password transmitted 315 by the client application 313. Upon verifying the digital signature, the proxy server 101 sends a randomly chosen secret password to the application server 102. The proxy server 101 checks for the same secret password during the application server's validation step 317. If the same secret password is verified, the proxy server 101 responds with a valid credential response to the application server 102. This approach obviates the need for the centralized directory 308.

Figure 11:
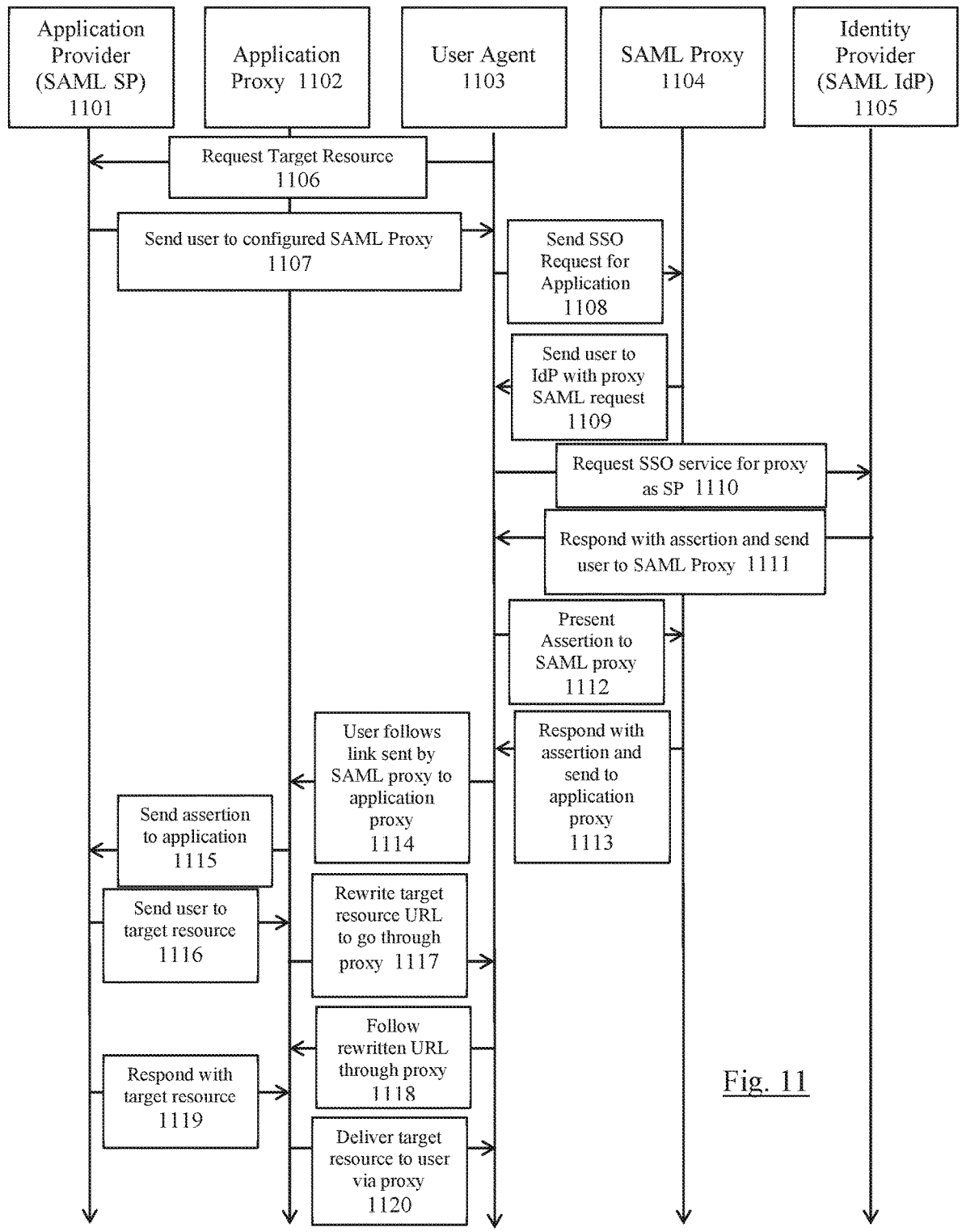
FIG. 11 illustrates an automatic routing and failover embodiment, according to an embodiment of the invention.

In an embodiment, automatic routing and failover may be achieved using communication sequences or data exchanges (e.g., Security Assertion Markup Language (SAML), etc.). FIG. 11 illustrates an example of a SAML proxy 1104 that can be placed in the data path between any combination of entities. In this example, the SAML proxy is in the data path between an application provider/application 1101, application proxy 1102, user agent 1103, and identity provider (IdP) 1105. The embodiment exposes an identity provider interface from identity provider 1105 to the application 1101. The application 1101 is configured with the SAML proxy's certificate. Authentication URLs and hence all login attempts are redirected to the SAML proxy 1104. The SAML proxy 1104 acts as a service provider to the original IdP 1105. The original IdP 1105 is configured to authenticate requests on behalf of the SAML proxy 1104 and sends the user back to the SAML proxy 1104 after authentication.

Upon successful authentication, the SAML proxy 1104 directs the user agent 1103 to the application proxy 1102 to achieve automatic routing to the application 1101.

The SAML proxy 1104 can monitor the application proxy's health and if the application proxy 1102 goes down or its functionality deteriorates, the SAML proxy 1104 routes the user directly to the application 1101, bypassing the application proxy 1102, and, thus, achieving failover. On the next login, the user can be sent back to the application proxy 1102, thereby achieving failback.

In this example, the user agent 1103 sends a request for a target resource 1106 to the application 1101. The application 1101 directs the user agent 1107 to the SAML proxy 1104. Using the IP address received in the received direction, the user agent 1103 sends a single sign on (SSO) request for the application 1108 to the SAML proxy 1104. The SAML proxy 1104 receives the request and directs 1109 the user agent 1103 to the IdP 1105. The user agent 1103 uses the IP address of the IdP 1105 to send an SSO request 1110 to the IdP 1105. The IdP 1105 validates the SSO request and responds with an assertion of a valid SSO 1111 for the SAML proxy. The user agent 1103 sends the assertion 1112 to the SAML proxy 1104. The SAML proxy 1104 creates and assertion for the application proxy and sends the assertion and the IP address of the application proxy 1113 to the user agent 1103.

The user agent 1103 passes the assertion to the application proxy 1114 using the IP address of the application proxy 1102. The application proxy 1102 forwards the assertion 1115 to the application service provider (SP) 1101. The application SP 1101 provides the target resource URL to the user 1116, in this case the application proxy 1102 sits in front of the application SP 1101 and receives the target resource URL. The application proxy 1102 rewrites the target resource URL to redirect the URL to the application proxy. The application proxy 1102 sends the rewritten URL 1117 to the user agent 1103.

The user agent 1103 receives the URL and accesses the application using the target resource URL 1118 which happens to be redirected through the application proxy 1102. The application proxy 1102 forwards any accompanying request to the application SP 1101. The application SP 1101 responds to the accompanying request 1119. The application proxy 1102 receives the response and forwards the response 1120 to the user agent 1103.

Figure 4:
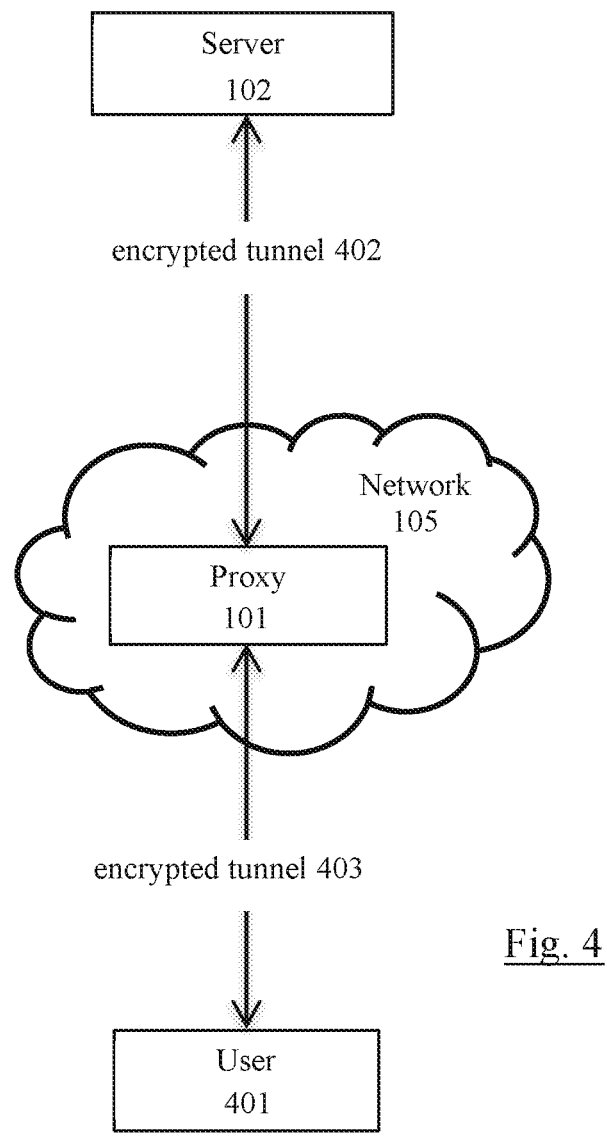
FIG. 4 illustrates a proxy in an encrypted tunnel, according to an embodiment of the invention.

Referring to FIG. 4, a proxy in an encrypted tunnel is shown. In an embodiment, a proxy 101 is inserted into the flow of traffic of an encrypted tunnel. The proxy 101 could bring together all applications available to each user into one or more portal pages. Each user would create an account and log into the proxy 101 to access the user's personal one or more portal pages, where the user can access particular applications listed on that portal page. In some situations, the application may only be visible inside the corporate network. In such cases, the network proxy 101 also allows for virtual private network (VPN) connections to the corporate firewall so that the proxy 101 can view the applications. One particular case to be considered in such routing is when the transport between the user and the server is encrypted via a protocol such as SSL. In such a case, the proxy server 101 creates an encrypted tunnel 403 between the user's content browser 401 and the proxy 101, and another encrypted tunnel 402 between the proxy 101 and the server 102.

4. ANALYTICS AND REPORTING

Figure 5:
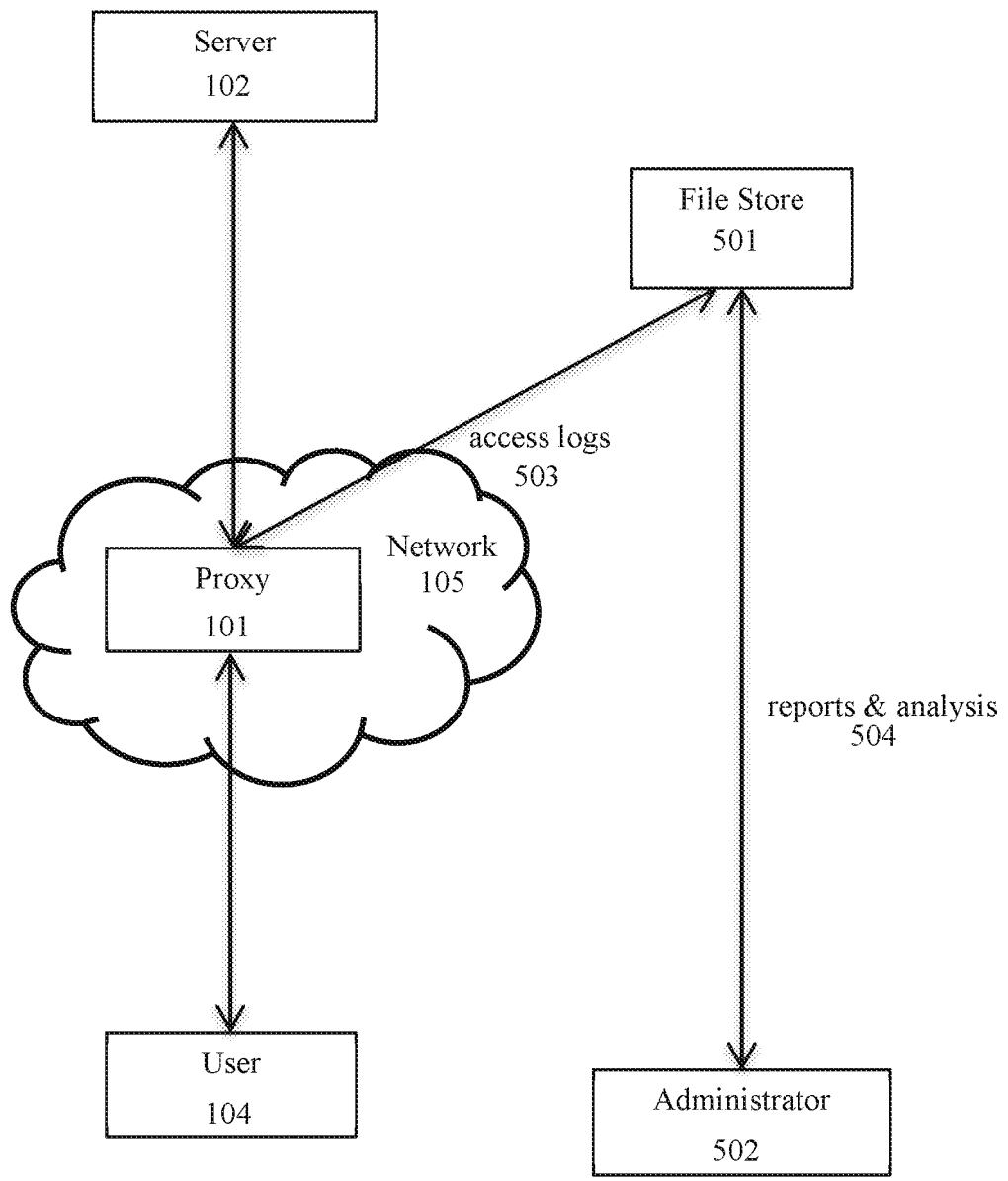
FIG. 5 illustrates an access and logging embodiment, according to an embodiment of the invention.

Referring to FIG. 5, an access logging and reporting embodiment is shown. The system logs and analyzes all user activity via the proxy 101. The proxy 101 logs each network request by users to applications routed through the proxy 101. The proxy 101 writes the logs 503 into a file store 501 that can then be accessed by an administrator 502 for creation or display of reports and analytics 504. For example, the logs can be queried by the administrator 502 to the file store 501 for user name and any specified time window in order to extract all accesses by a specific user during the time window. Conversely, logs can be queried by document and time window to identify all users who accessed the document during the time window. Other combinations and queries are also possible. In an alternate embodiment, such queries may be made to a database server that uses file store 501 to populate its tables.

5. DATA TRACKING AND WATERMARKING

Figure 6:
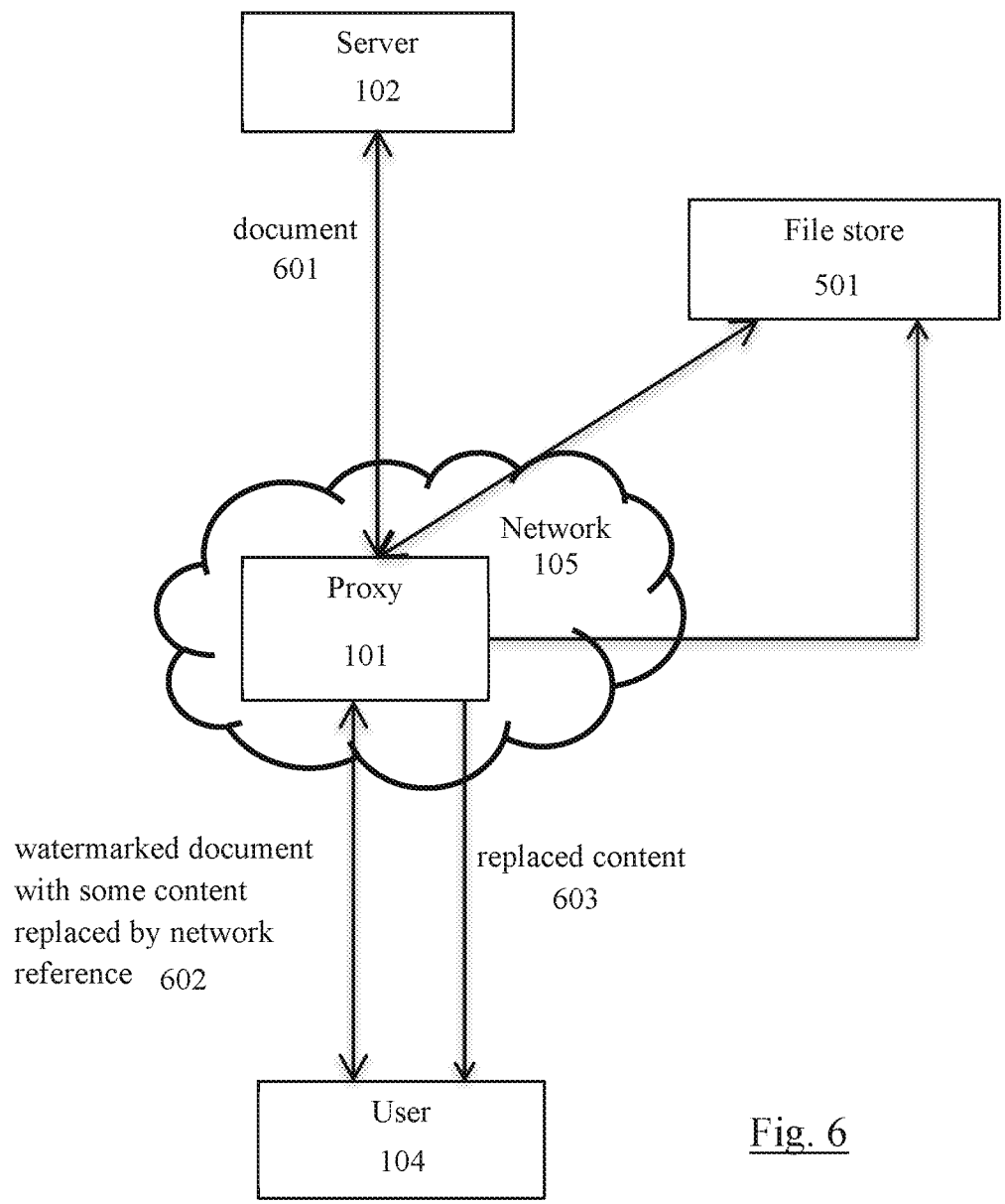
FIG. 6 illustrates a document watermarking and tracking embodiment, according to an embodiment of the invention.

Referring to FIG. 6, a document watermarking and tracking embodiment is shown. The system tracks data flowing through the proxy 101. For common document types such text documents, spreadsheets and slide presentations, the proxy inserts a watermark that includes information such as user name, date and time of access, etc. For example, in the case where a user receives a document as an attachment to an email, the proxy 101 can insert a watermark in the attachment bearing the user's name, the date and time of download, etc. The proxy 101 can also insert a line at the bottom of the email advising the user of the watermark. If the user disseminates the document in a public forum, the document can be traced to the user via the watermark. The system allows an administrator to submit any document for identification in order to extract the information contained in the watermark.

As a deterrent, the system may also insert a message into an email advising the user of the watermark. For example, if the user receives a document as an attachment in an email, the system appends text to the email advising the user that the attachment has been watermarked. In the case where the user downloads a document from a web page, the system pops up an advisory message before proceeding with the download and watermarking the document.

In another embodiment, the proxy 101 replaces a portion of the content in the document with a network address. The proxy 101 can remove a portion of the content in the document 601, store the removed portion in a file store 501, and replace the content in the document with the network address of content 602 as stored in the proxy 101. When the document is viewed, a call can be made by the document reader over the network 105 to the proxy 101 for the content stored on the proxy or file store 501. The call may include identifying information as the time of day, location of user, watermark inside the document, etc. The proxy 101 can fetch the content from the file store 501 and forward the content 603 to the user 104 for insertion into the document.

In the foregoing, the proxy 101 logs each access to the replaced content including information such as time of access, identity of the user, type of user device (e.g., smartphone, tablet, laptop, etc.), network address, geographic location of user, type of content browser or viewer, etc. The logs are available for analysis and reporting as discussed above. For example, an administrator may enter the name of a document and receive a list of all views of that document. Alternatively, all views of the document may be presented on a geographic map with each view being depicted by a flag. Clicking on a flag could pull up details about that view including time of view, user name, etc. In another embodiment, the proxy 101 can maintain a searchable index of all documents that were watermarked by the proxy. In such case, an administrator could search for documents by keyword to receive a list of all such documents, and then drill down on each unique document in the list to obtain a report of all views of the document either as a list or as a map.

In another embodiment, the proxy 101 may be configurable so that some portions or all of the content in the document may be replaced with network addresses, thereby limiting access to the content to only those users authorized to view the content or specific portions. More generally, different users may be allowed access to different portions of the content, so that sensitive portions of the content are effectively redacted in their entirety for some users. Redactions can be dynamically controlled over the network in that a user's permission to view portions of the content may be turned on or off by the administrator.

In an embodiment, a collection of documents, e.g., a digital file folder, etc., may be made available for a configurable time window to a group of users. Each document in the collection may have its contents replaced with a network address as discussed above. At the end of the time window, the original content is removed from the network address, thus, making the content inaccessible. The benefit of this embodiment is that, during the time window, the users can view the documents or freely email them as attachments. At the end of the time window, the contents of the documents are no longer available even within the emailed attachments.

6. BROWSER CACHE MANAGEMENT

Figure 7:
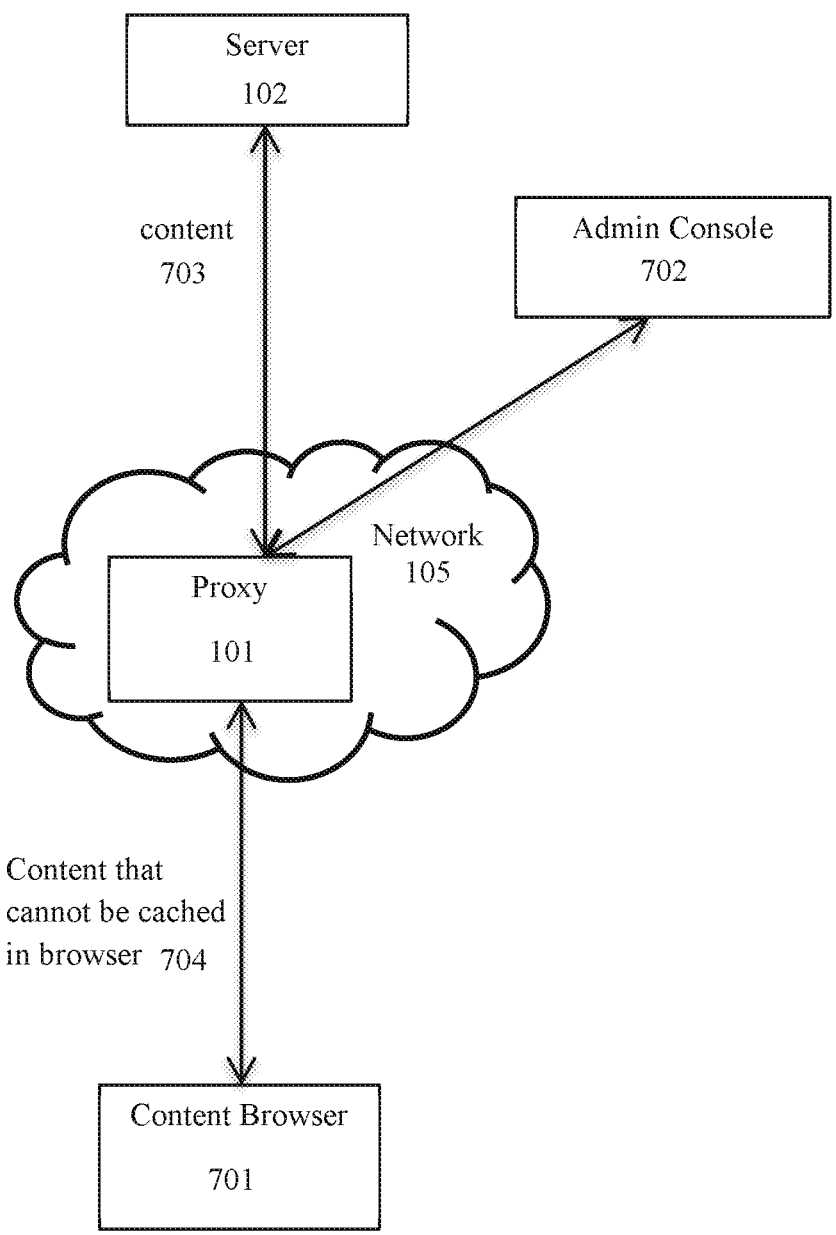
FIG. 7 illustrates a configurable browser cache management embodiment, according to an embodiment of the invention.

Referring to FIG. 7, a configurable browser cache management embodiment is shown. In an embodiment, content browsers used to access content via the network proxy 101 may be managed. The network proxy 101 may be configured to ensure that a configurable portion of the content flowing through the proxy 101 may be marked to be non-cacheable by content browsers. This prevents sensitive content from being cached on browsers of mobile client devices. Furthermore, the network proxy 101 may be configured to ensure that login information such as user names and passwords cannot be stored in content browsers used to access content via the proxy 101.

The proxy 101 receives each request for content from the content browser 701 and forwards the request to the content server 102 on behalf of the proxy 101. Upon receiving a response 703 from the content server 102, the proxy 101 overwrites the cacheability attributes of the content 703. In the case of web browsers, content headers include cacheability attributes such as whether or not the piece of content may be cached and, in the event the content is cacheable, the duration for which it may be cached. The proxy 101 can override any cacheability attributes set by the content server 102 stipulating the content to be uncacheable.

7. MANAGEMENT CONSOLE AND ACCOUNTING

Figure 8:
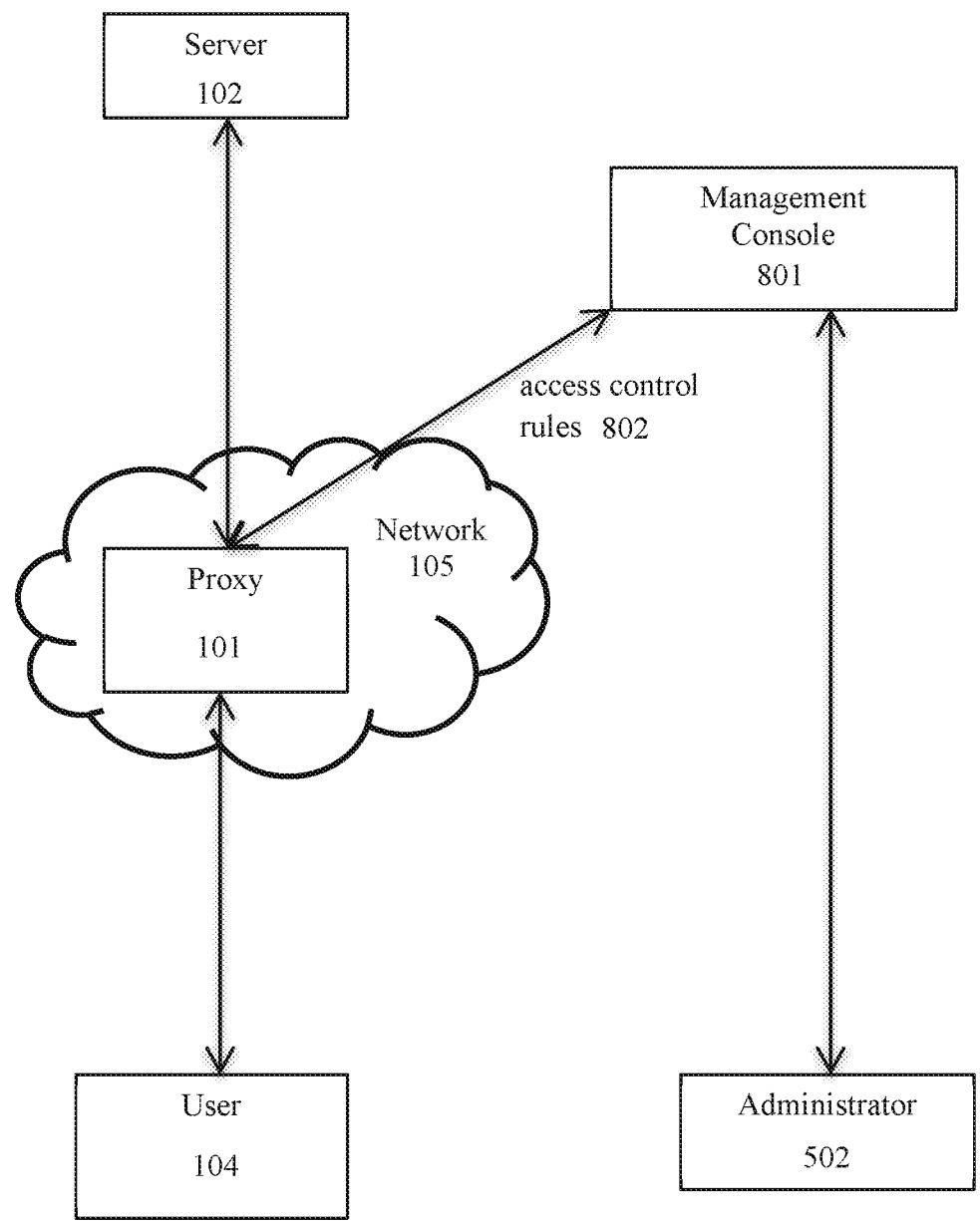
FIG. 8 illustrates a management console, according to an embodiment of the invention.

Referring to FIG. 8, an access logging and reporting embodiment is shown. A management console 801 allows an administrator 502 to configure settings and view access reports. The management console 801 also keeps track of the users administered in the account and allows the administrator 502 to customize access control policies by users or groups of users. An administrator 502 can control access to data and applications for each user by creating and/or modifying access control rules 802. For instance, some users may not be allowed access to certain applications from their mobile devices. Other users may not be allowed access to some sensitive applications while traveling outside of the office building.

8. DATA ENCRYPTION

Figure 9:
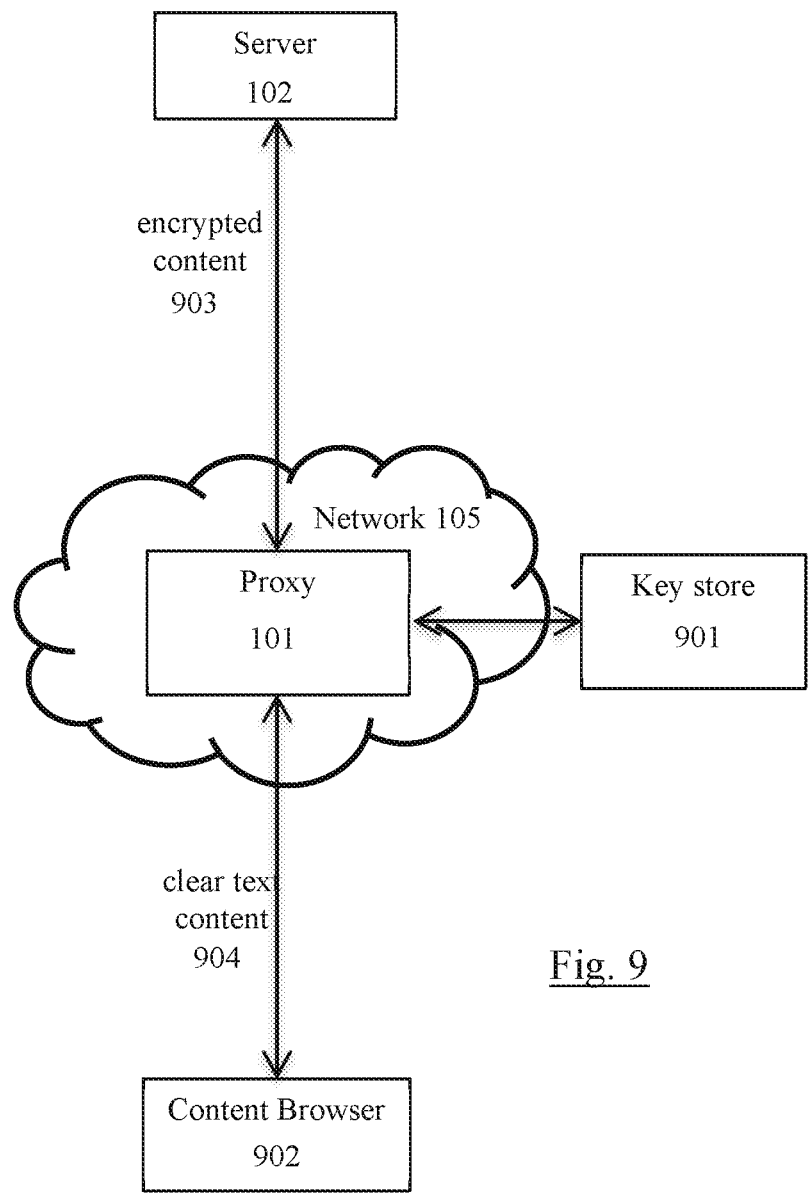
FIG. 9 illustrates an encrypted storage embodiment, according to an embodiment of the invention.
Figure 12:
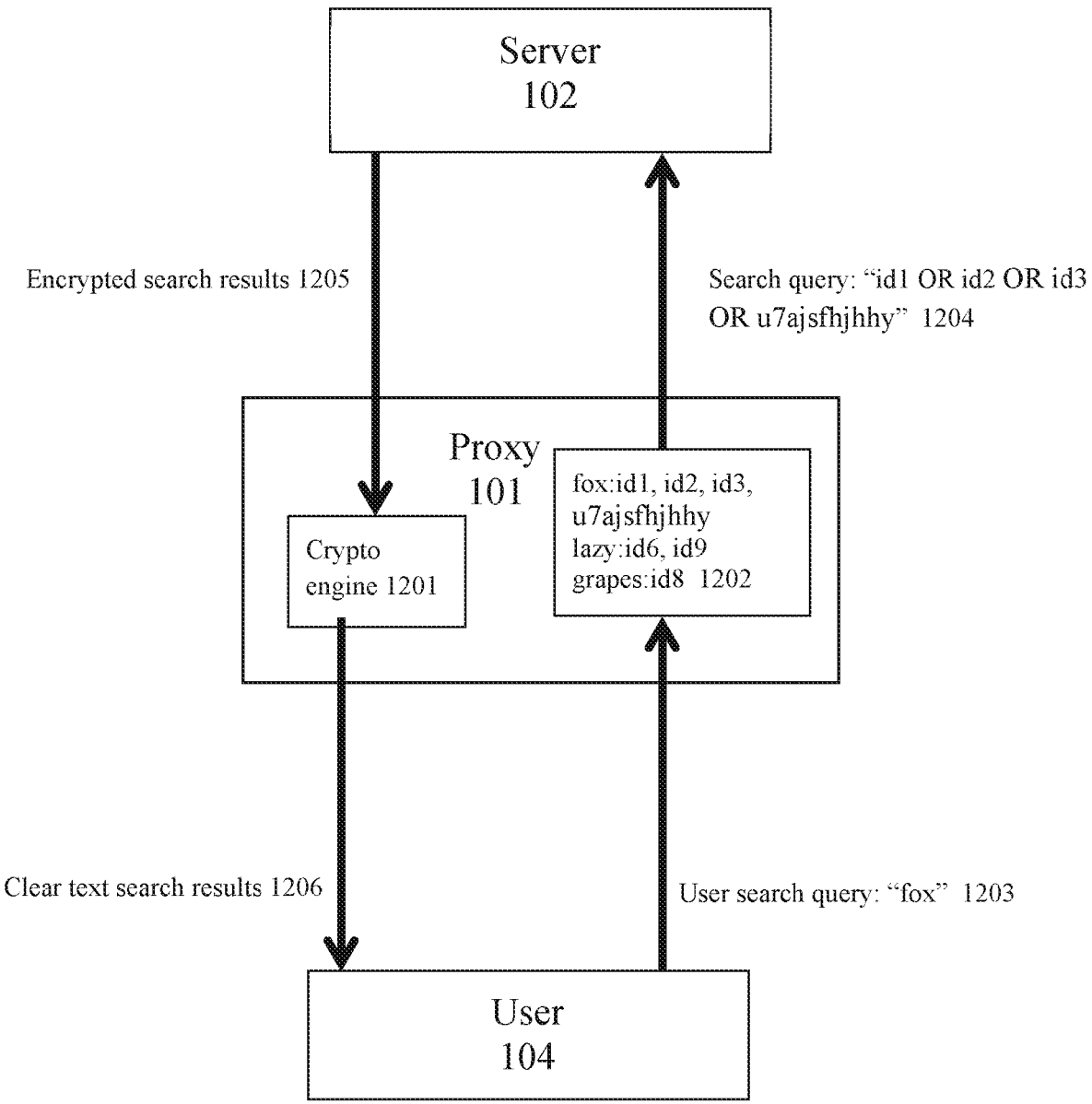
FIG. 12 illustrates an encrypted storage embodiment, according to an embodiment of the invention.

Referring to FIGS. 9 and 12, an encrypted storage embodiment is shown. The proxy 101 can encrypt data entered by the user (e.g., via a content browser 902) for storage on the server and decrypt the data on-the-fly when a user views the data (e.g., via a content browser 902). In such a case, if the security of the server is breached by an attacker, only the encrypted data is revealed. In an embodiment, the proxy 101 maintains encryption keys in a key store 901 for each group of users. When a user attempts to store data on the server 102, the proxy 101 can fetch the appropriate encryption keys from the key store 901, and encrypt the content prior to forwarding the content 903 to the server 102. In turn, when the user attempts to retrieve content from the server 102, the proxy 101 receives the encrypted content 903 from the server 102, retrieves decryption keys from the key store 901, decrypts the content, and forwards the content 904 to the user 902.

It is desirable to encrypt data stored in cloud applications such as Salesforce.com, Google mail, etc. However, while search and sort capabilities are an important part of these applications, strongly encrypted data cannot be searched or sorted. An embodiment includes the ability to search through and sort the encrypted data using keywords selected and/or specified by a user or other system. Typically, strongly encrypted data cannot be searched or sorted. A document that is encrypted with a randomly chosen key using a strong algorithm, such as AES, is completely unintelligible and contains no visible trace of any words from the original document. This means that the encrypted document cannot be sorted or searched for the occurrence of any word occurring in the original document, even though the document can be decrypted to yield the original document in its entirety.

The proxy 101 can be a "split-index" proxy fronting one or more cloud applications (which may reside on server 102 or more than one server) and can maintain a clear text search index of words 1202. Each index entry can contain a keyword and an associated list of identifiers, e.g., the index entry for the word "fox" may appear as: {fox: id1, id2, id3}, where each identifier {id1, id2, id3 . . . } in the list is a pointer to an encrypted data record in the cloud application. In an embodiment, the keywords may be determined by searching the file to be stored or entries to be stored to be determine what keywords may be used for the document. The keywords may also be words that have determined to be common search terms among files or entries for the particular cloud application. The proxy 101 can maintain a search index for a particular file server or servers, cloud application, group of cloud applications (e.g., grouped by cloud application publisher, etc.), logical/physical drive, company, user, etc. A particular search index can be selected by the proxy 101 in context with the file or entries to be stored or, when a search is to be performed, the context of the search (which may involve permissions, user identification, etc.).

When a user enters data for storage on the server 102, the proxy 101 encrypts the data in its entirety as described herein. For example, a clear text string "S" is entered and the proxy 101 encrypts the data as a string e(S) using a bulk encryption algorithm, e.g., AES-256, etc. The proxy 101 may append a one-time random pad to the clear text data prior to encryption for added security. Then, the proxy 101 can select a prefix P of fixed length, e.g., 256 bits, of the encrypted data. Alternatively, optionally, or additionally, the proxy 101 can append a random string P of fixed length, e.g., 256 bits, within the encrypted data where certain words appear in the unencrypted data. In either case, the string P is the unique identifier associated with the encrypted data record. The proxy 101 can then forward the concatenated string "e(s) P" to the server 102 for storage. For each unique word in the plaintext version of the data, the proxy 101 creates an entry in the index if such an entry does not already exist. The proxy 101 appends the string P to the list of identifiers for that word in the index. For example, the proxy 101 might append a randomly chosen string P, such as "u7ajsfhjhhy", to the encrypted data where the word "fox" occurs in the unencrypted data. The proxy 101 may also append the same string P to the entry in the index for "fox" so that, for example, the dictionary entry appears as: {fox: id1, id2, id3, u7ajsfhjhhy}.

In an embodiment, in some situations, the original clear text data may comprise several fields and the proxy 101 encrypts only some of the fields. For example, if the cloud application is an email application, the proxy 101 may encrypt the subject of the email, the body of the email, and any attachments while the email addresses of the sender and recipients are not encrypted.

In an embodiment, when a user enters a search query comprised of one or more keywords in a designated search box on his content browser 902, the user believes that he is connected to the server 102 and is performing the search via the server 102, instead, the proxy 101 services the content browser's query. The search box in the content browser 902 may be associated with a search application program that is routed to the proxy 101, as described above, that provides a search function for searching encrypted data stored on the server. The proxy 101 searches the entries in the index for each of the one or more keywords. The result of the search is a set of identifiers associated with those keywords. The proxy 101 then issues a search query to the cloud application to search the encrypted data for the set identifiers. For example, in the examples above, in response to a search for the word "fox" 1203, to search the encrypted data for the word "fox" found in the index 1202, the proxy 101 would issue a search query 1204 to the cloud application of the form "id1 OR id2 OR id3 OR u7ajsfhjhhy." The proxy 101 then decrypts 1201 at least a portion of the encrypted data from the search results 1205 returned from the cloud application where an identifier is found and sends the decrypted data 1206 to the user's device 104 to be displayed as search results. In an embodiment, the clear text index can be implemented using open source software such as Lucene, etc., thereby supporting enhancements such as wildcard searches, keyword autocomplete, partial word searches, and so forth.

In an embodiment, in the encryption phase the proxy 101 can encrypt the data and associate a unique identifier with the encrypted data without creating entries in the search index. A separate indexing process can be run continuously that: (a) fetches each encrypted record from the server 102, (b) decrypts the record, and (c) for each unique clear text word in the record, adds the identifier for the encrypted record to the search index on the proxy 101. In an embodiment, the proxy 101 may encrypt the unencrypted record using a new encryption key (e.g., different from the encryption key used on the original encrypted record, etc.) or new encryption protocol/algorithm (e.g., different from the encryption protocol used on the original encrypted record, etc.) and send the modified encrypted record back to the server 102 to replace the original encrypted record. In an embodiment, the proxy 101 may, as described above, insert an identifier string P in the encrypted record and send the modified encrypted record back to the server 102 to replace the original encrypted record. In an embodiment, the proxy 101 may encrypt the unencrypted record using a new encryption key (e.g., different from the encryption key used on the original encrypted record, etc.) or new encryption protocol/algorithm (e.g., different from the encryption protocol used on the original encrypted record, etc.) before inserting identifier strings in the encrypted record. Using a new encryption key to encrypt the records fetched from the server 102 helps prevent or subvert any compromises in the server encryption protocol/algorithm. It can additionally facilitate any changes in encryption protocols/algorithms. In an embodiment, the proxy 101 can perform a background sweep of the encrypted records stored on server 102, retrieving encrypted records, unencrypting the encrypted records, encrypting the unencrypted records using a new encryption key (e.g., different from the encryption key used on the original encrypted record, etc.) or new encryption protocol/algorithm (e.g., different from the encryption protocol used on the original encrypted record, etc.), and sending the newly encrypted records to the server 102 to replace the original encrypted records.

The indexing process on the proxy 101 may also perform housekeeping chores such as removing identifiers in the search index that correspond to deleted records on the server 102. In an embodiment, keywords may be determined from each encrypted record and entered into the search index as described above.

In an embodiment, not all of the data on the server 102 may be encrypted. For example, there may be preexisting data on the server 102 prior to deployment of the proxy 101. In such case, in addition to the modified search query keywords described above, the proxy 101 queries the server 102 with the clear text search keywords. The proxy 101 then combines the decrypted and clear text search results prior to presenting the combined set to the user.

An embodiment sorts the encrypted data alphabetically. The proxy 101 can encrypt all but the first character in each data field so that the encrypted data supports sorting by the first character in each data field. The proxy 101 can further refine the sorted data retrieved from the cloud application before sending the results to the user.

9. ENHANCED APPLICATION PERFORMANCE

In an embodiment, application performance on networks that are congested or have high-latency such as cellular & public WIFI networks may be enhanced. The proxy 101 in the present invention optimizes the content for network conditions and device type. For example, the proxy 101 may compress all transmissions to the client device. The proxy 101 may also resize the content to further optimize performance based on the type of the device. For example, if the client device is a smartphone with a small screen, the proxy 101 may reduce the resolution of images embedded in the content. Furthermore, the proxy 101 may adjust packet transmission rates in network transport in order to maximize performance in networks with higher packet loss. For example, in cellular networks, when congestion is high, the packet loss rate goes up, thereby driving up the need to retransmit the same packets. Hence, although the raw transmission rate is high, the same packets are transmitted many times leading to a low information transfer rate. Under such conditions, the proxy 101 may automatically throttle the transmission rate down to achieve higher overall performance.

Note that, although separate embodiments are discussed herein, any combination of embodiments and/or partial embodiments discussed herein may be combined to form further embodiments.

10. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
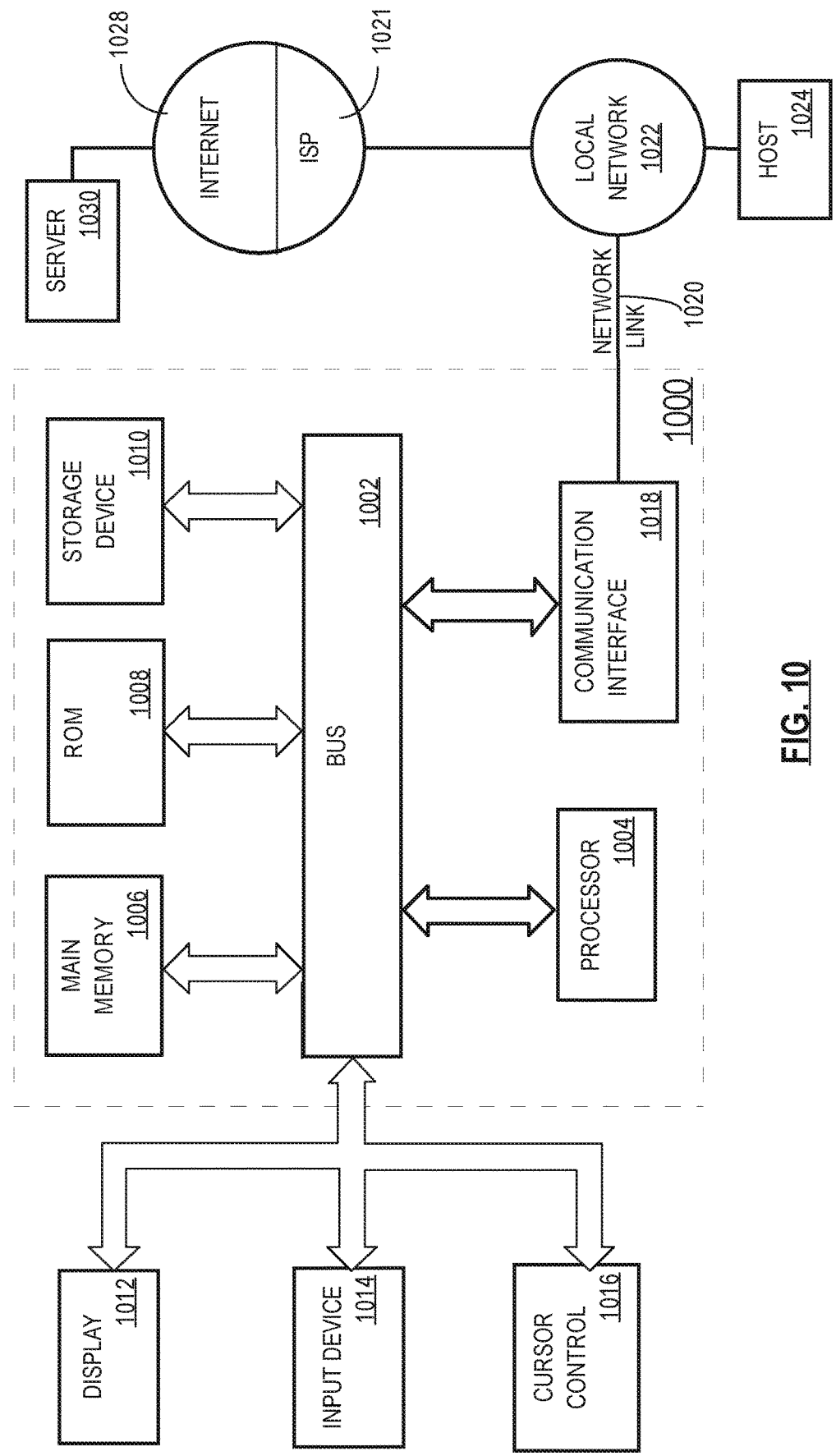
FIG. 10 illustrates an example hardware platform on which a computer or a computing device as described herein may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is device-specific to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a liquid crystal display (LCD), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using device-specific hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

11. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a proxy server, comprising:
   receiving a third-party application access request and authentication credentials from a corporate client device, the third-party application residing on an application server hosted by a third-party, the application server configured to validate authentication credentials at the proxy server;
   encrypting the authentication credentials, the encrypted authentication credentials are encrypted such that the encrypted authentication credentials are only decryptable by the proxy server;
   sending the encrypted authentication credentials and the third-party application access request to the application server;
   receiving the encrypted authentication credentials back from the application server in an authentication request;
   validating decrypted authentication credentials against a corporate directory; and
   sending the application server results of validating the decrypted authentication credentials.

2. The method as recited in claim 1, wherein the application access request requests access to a resource managed by the application server.

3. The method as recited in claim 1, wherein the application access request requests access to application specific data stored on the application server.

4. The method as recited in claim 1, wherein prior to the encrypting the authentication credentials:
   receiving a digitally signed certificate from the corporate client device;
   validating the digitally signed certificate by using a public key of the corporate client device to decrypt the digitally signed certificate;
   upon successful decryption of the digitally signed certificate, performing the encrypting the authentication credentials.

5. The method as recited in claim 1, wherein the authentication credentials from the corporate client device are received in clear-text.

6. The method as recited in claim 1, further comprising:
   receiving a response to the results of validating the decrypted authentication credentials from the application server;
   forwarding the response to the corporate client device.

7. One or more non-transitory computer-readable storage media, storing one or more sequences of instructions for operation of a proxy server, which when executed by one or more processors cause performance of:
   receiving a third-party application access request and authentication credentials from a corporate client device, the third-party application residing on an application server hosted by a third-party, the application server configured to validate authentication credentials at the proxy server;
   encrypting the authentication credentials, the encrypted authentication credentials are encrypted such that the encrypted authentication credentials are only decryptable by the proxy server;
   sending the encrypted authentication credentials and the third-party application access request to the application server;
   receiving the encrypted authentication credentials back from the application server in an authentication request;
   validating decrypted authentication credentials against a corporate directory; and
   sending the application server results of validating the decrypted authentication credentials.

8. The one or more non-transitory computer-readable storage media as recited in claim 7, wherein the application access request requests access to a resource managed by the application server.

9. The one or more non-transitory computer-readable storage media as recited in claim 7, wherein the application access request requests access to application specific data stored on the application server.

10. The one or more non-transitory computer-readable storage media as recited in claim 7, wherein prior to the encrypting the authentication credentials:
    receiving a digitally signed certificate from the corporate client device;
    validating the digitally signed certificate by using a public key of the corporate client device to decrypt the digitally signed certificate;
    upon successful decryption of the digitally signed certificate, performing the encrypting the authentication credentials.

11. The one or more non-transitory computer-readable storage media as recited in claim 7, wherein the authentication credentials from the corporate client device are received in clear-text.

12. The one or more non-transitory computer-readable storage media as recited in claim 7, wherein the one or more sequences of instructions, which when executed by the one or more processors cause further performance of:
    receiving a response to the results of validating the decrypted authentication credentials from the application server;
    forwarding the response to the corporate client device.

13. A proxy server, comprising:
one or more processors; and
a memory storing instructions, which when executed by the one or more processors, cause the one or more processors to:
  receive a third-party application access request and authentication credentials from a corporate client device, the third-party application residing on an application server hosted by a third-party, the application server configured to validate authentication credentials at the proxy server;
  encrypt the authentication credentials, the encrypted authentication credentials are encrypted such that the encrypted authentication credentials are only decryptable by the proxy server;
  send the encrypted authentication credentials and the third-party application access request to the application server;
  receive the encrypted authentication credentials back from the application server in an authentication request;
  validate decrypted authentication credentials against a corporate directory; and
  send the application server results of validating the decrypted authentication credentials.

14. The proxy server as recited in claim 13, wherein the application access request requests access to a resource managed by the application server.

15. The proxy server as recited in claim 13, wherein the application access request requests access to application specific data stored on the application server.

16. The proxy server as recited in claim 13, wherein prior to the encrypting the authentication credentials:
  receive a digitally signed certificate from the corporate client device;
  validate the digitally signed certificate by using a public key of the corporate client device to decrypt the digitally signed certificate;
  upon successful decryption of the digitally signed certificate, performing the encrypting the authentication credentials.

17. The proxy server as recited in claim 13, wherein the authentication credentials from the corporate client device are received in clear-text.

18. The proxy server as recited in claim 13, further comprising:
  receive a response to the results of validating the decrypted authentication credentials from the application server;
  forward the response to the corporate client device.

* * * * *